United States Patent
Richt et al.

(10) Patent No.: US 9,216,459 B2
(45) Date of Patent: Dec. 22, 2015

(54) DRILLING MACHINE, IN PARTICULAR HAND-HELD CORE DRILLING MACHINE

(75) Inventors: Boris Richt, Hemmingen (DE); Armin Eisenhardt, Bisingen (DE)

(73) Assignee: C. & E. FEIN GMBH (DE)

( * ) Notice: Subject to any disclaimer, the term of this patent is extended or adjusted under 35 U.S.C. 154(b) by 707 days.

(21) Appl. No.: 13/458,244

(22) Filed: Apr. 27, 2012

(65) Prior Publication Data

US 2012/0275874 A1    Nov. 1, 2012

(30) Foreign Application Priority Data

Apr. 28, 2011 (DE) .......................... 10 2011 100 278

(51) Int. Cl.
| | |
|---|---|
| B23B 51/08 | (2006.01) |
| B23B 51/04 | (2006.01) |
| B23B 45/00 | (2006.01) |
| B28D 1/04 | (2006.01) |
| B28D 1/14 | (2006.01) |

(52) U.S. Cl.
CPC .......... *B23B 51/0426* (2013.01); *B23B 45/008* (2013.01); *B28D 1/041* (2013.01); *B28D 1/14* (2013.01); *Y10T 408/65* (2015.01)

(58) Field of Classification Search
USPC ................... 408/36, 6, 9, 124, 139, 204, 206
See application file for complete search history.

(56) References Cited

U.S. PATENT DOCUMENTS

| | | | | |
|---|---|---|---|---|
| 192,793 | A | * | 7/1877 | Shoots ............................ 408/36 |
| 1,195,145 | A | * | 8/1916 | Mattingly ....................... 408/36 |
| 1,202,782 | A | * | 10/1916 | Blauvelt ....................... 408/118 |
| 2,345,403 | A | | 3/1944 | McGrew |
| 2,813,280 | A | * | 11/1957 | Huffman ........................ 408/10 |
| 2,838,962 | A | * | 6/1958 | Curtis ............................ 408/36 |
| 4,226,591 | A | * | 10/1980 | Leonard ....................... 433/133 |
| 4,306,570 | A | * | 12/1981 | Matthews ..................... 600/567 |
| 2007/0282344 | A1 | * | 12/2007 | Yedlicka et al. ............... 606/80 |
| 2010/0271010 | A1 | * | 10/2010 | Stevens et al. ............. 324/207.2 |

FOREIGN PATENT DOCUMENTS

| | | |
|---|---|---|
| CH | 312072 A | 12/1955 |
| DE | 19717031 C1 | 10/1998 |
| DE | 1950599 A1 | 3/2001 |
| DE | 102009040513 A1 | 3/2011 |

* cited by examiner

*Primary Examiner* — Sunil K Singh
*Assistant Examiner* — Alan Snyder
(74) *Attorney, Agent, or Firm* — St. Onge Steward Johnston & Reens, LLC (57) ABSTRACT

The invention discloses a drilling machine, in particular a hand-held core drilling machine, having a drive with a motor that can be coupled to a tool spindle in order to drive the latter, wherein the drive allows at least a first transmission stage and a second transmission stage, having a center mount for mounting a pilot drill and having a tool mount for mounting a drill bit, wherein the drill bit and the pilot drill can be mounted substantially concentrically with one another, wherein the pilot drill, in particular in order to drill a pilot hole, can be driven in a first rotational speed range by means of the first transmission stage and wherein the drill bit, in particular in order to drill a core hole, can be driven in a second rotational speed range by means of the second transmission stage.

17 Claims, 8 Drawing Sheets

Fig.11d

DRILLING MACHINE, IN PARTICULAR HAND-HELD CORE DRILLING MACHINE

CROSS-REFERENCES TO RELATED APPLICATIONS

This application claims priority from German patent application Serial No. 10 2011 100 278.6, filed on Apr. 28, 2011. The entire contents of this priority application is incorporated herein by reference.

BACKGROUND OF THE INVENTION

The invention relates to a drilling machine, in particular a hand-held core drilling machine, to a drilling machine-tool combination and to the use of such a drilling machine.

Core drilling is well known. In core drilling, a core drill, also called a drill bit, machines a substantially annular groove around a drilling core of a material to be drilled. In particular in the case of large drilling diameters and drilling depths, core drilling is particularly productive, since not all of the drilling cross section has to be machined. Core drilling is generally used widely in the building industry, for instance for drilling perforations in masonry, concrete or rock.

In order to drill in particular large core holes, core drilling appliances or core drilling machines are coupled usually to a stand or framework which is fixed to the work-piece. Such a drilling stand is intended to ensure sufficient guidance during the drilling operation and can furthermore be provided with manual or motor-driven feed drives. In addition, the drilling stands can absorb or support a counter-torque that is produced during drilling, said counter-torque being in the opposite direction to the drive torque. Thus, the burden on an operator can be significantly relieved and the risk of the core drill becoming jammed can be reduced considerably.

A disadvantage with stand-bound core drilling machines is the high time requirement for fastening and for setting up the stand. Thus, it is possible for instance for stands to have to be fixed to the masonry by way of a plurality of screw connections, which in turn have to be pre-drilled manually.

In order to drill core holes, in particular core holes having comparatively small dimensions, core drilling appliances can furthermore be guided manually or held manually. In order to improve guidance during the drilling operation, there can be provided tools, in the case of which the drill bit for drilling the drilling core is coupled to a center drill for drilling a center hole or pilot hole. In this case, the center drill is usually offset towards a workpiece to be drilled compared with a core drill bit, and so its tip can penetrate the workpiece alone at the start of the drilling operation without there being any significant engagement of the drill bit with the workpiece. The diameter of the center drill is in this case smaller than the diameter of the drill bit. In this way, although two concentric holes are introduced into the workpiece, the center drilling operation is tolerated for improving guidance in the case of hand-held core drilling.

A core drilling machine is known for instance from DE 10 2009 040 513 A1. This is a core drilling machine having a hollow drilling shaft which can be set into rotation by a drive unit. The core drilling machine is furthermore designed to hold a drill bit and a center drill. It has been shown that the center drill can improve the guidance of the core drilling machine when a core hole is drilled with the drill bit.

Core drilling is used in metalworking, too. However, since core holes in metal usually have to be made with greater precision than for instance core holes in masonry, primarily core drilling appliances which are guided on drilling stands were initially used. In the case of metal workpieces, such stands can be fixed for instance by magnetic force or by means of negative pressure. In addition, more recently, applications for hand-held core drilling in metal have been realized. In this case, particular requirements are imposed on the centring of the drill bit in order to prevent the drill bit from "running away". A "run away" hole results in an increased tendency for the tool to jam or even break. Moreover, the probability of the resulting hole not being able to be used increases, since it does not satisfy the necessary accuracy.

SUMMARY OF THE INVENTION

In view of this, it is a first object of the invention to disclose a drilling machine which allows quick and productive drilling of core holes.

It is a second object ob the invention to disclose a core drilling machine which is particularly suited for core drilling in metal workpieces with great accuracy.

It is a third object ob the invention to disclose a core drilling machine which is to be as easy to operate as possible.

According to one aspect these and other objects are solved by a drilling machine drilling machine, comprising:
   a tool spindle for driving a tool;
   a drive including a motor for driving said tool spindle, said drive including at least a first transmission stage and a second transmission stage;
   a center mount provided on said tool spindle for mounting a pilot drill;
   a tool mount provided on said tool spindle for mounting a drill bit;
   wherein said center mount and said tool mount are arranged substantially concentrically with one another;
   wherein said center mount is configured for coupling to said first first transmission stage of said drive;
   wherein said tool mount is configured for coupling to said second transmission stage of said drive;
   whereby said pilot drill can be driven at a first rotational speed range, and said drill bit can be driven at a second rotational speed range different from said first rotational speed range.

The object of the invention is fully achieved in this way.

Specifically, according to the invention, when a core hole is drilled, a pilot hole for centering can now be pre-drilled at a first tool rotational speed and the actual core hole can be drilled at a second tool rotational speed. This ensures good guidance of the drilling machine during drilling. In addition, the first transmission stage allows the pilot drill to be driven at a higher rotational speed so that the centring operation does not lead to a substantial lengthening of the time taken up by the drilling operation.

Such a core drilling machine is suitable in particular for introducing core holes into metal.

The first transmission stage can regularly provide a first rotational speed range for the pilot drill, which allows in principle higher tool rotational speeds than the second transmission stage, which provides a second rotational speed range for the drill bit. The rotational speeds can in this case be matched for instance to the diameter of the pilot drill and of the drill bit, respectively. It is thus easily possible to realize a suitable cutting speed, which is both adapted for the pilot drill, in particular when the pilot hole is drilled, and is also matched to the drill bit, for instance when the core hole is drilled.

Operating the respective (part) tool at a suitable tool rotational speed can help to increase the service life of the tool, to have a beneficial effect on the production of heat during drilling and to reduce wear. The performance of the drilling machine can be improved overall. The guidance of the drilling machine over the pilot hole when the core hole is drilled can reliably help to prevent the tool from "running away" or to reduce this. The core hole can be produced in a dimensionally accurate manner.

In order to provide the at least one first transmission stage and an at least second transmission stage, the drive can have for instance a suitable gear mechanism. However, the drive can likewise be provided with a suitable control for the motor, said control influencing the characteristics of the motor such that the tool spindle can be driven in different rotational speed ranges. To this extent, the drive can have for instance a "virtual" gear mechanism, too.

Such a "virtual" gear mechanism can allow for instance field windings of an electric motor to be influenced in a targeted manner. In this case, for example, field windings can be switched on or switched off, or the polarity of sections of the field windings can be reversed selectively, in order to influence the characteristics of the electric motor. Different rotational speed-torque characteristic curves which allow a gear-mechanism functionality can thus arise. These characteristic curves can be for instance offset from one another, in particular moved in parallel, in a rotational speed-torque diagram, or have different gradients. In particular, rotational speed-torque characteristic curves having different gradients can correspond in their effect to different stages for instance of a shift gear mechanism. In addition or as an alternative, the excitation voltage of the motor can be varied in order to influence the drive characteristics. The excitation voltage can be varied in principle with regard to frequency, absolute magnitude or with regard to the signal curve. Further, pulse-width modulation of the excitation voltage is conceivable.

It should be added that the pilot drill and the drill bit can be mounted indirectly or directly on the tool spindle. In particular, for instance the drill bit itself can have at least a part of the center mount for the pilot drill or, vice versa, the pilot drill can provide a part of the tool mount for the drill bit. In principle, the drill bit and the pilot drill can be understood as being an integrated tool, with the pilot drill and the drill bit being coupled together. It is likewise conceivable to provide the pilot drill and the drill bit as separate (part) tools and to couple them indirectly via the drilling machine.

According to a further aspect of the invention, the drilling machine further has a switching device which interacts with the drive and is designed to operate the drive selectively at least in a center drilling configuration or in a core drilling configuration, wherein, in the center drilling configuration, at least the pilot drill can be driven in the first transmission stage, and wherein, in the core drilling configuration, at least the drill bit can be driven in the second transmission stage.

In this way, the drilling operation can be started for instance in the center drilling configuration. For example, in order to ensure good guidance, the drilling machine can be converted into the core drilling configuration when the pilot drill has penetrated far enough into the workpiece.

Such "switching" of the drive between the first transmission stage and the second transmission stage can be carried out in principle manually by the operator. Alternatively or in addition, the "switching" can take place automatically.

The switching device can help to further simplify and to accelerate the drilling operation. The drilling machine can be operated particularly efficiently, in particular even without a further manual control action.

According to a further refinement, the drive has a gear mechanism, in particular a mechanical gear mechanism, which is connected between the motor and the tool spindle and which provides a first transmission ratio in the first transmission stage and a second transmission ratio in the second transmission stage.

The gear mechanism can be configured for instance as a mechanical gear mechanism having at least one gearwheel set. However, in principle, friction gear mechanisms, fluidic gear mechanisms or the like can likewise be provided. The gear mechanism can likewise be configured as a virtual gear mechanism, in which case in particular the characteristics of the motor can be influenced in a suitable manner.

The gear mechanism can be in the form for instance of a shift gear mechanism, transfer gear mechanism or as a combination thereof. A shift gear mechanism can have at least one output which can be activated with different transmission ratios. A transfer gear mechanism can, in its basic configuration, have a plurality of outputs, which may in principle provide a plurality of transmission ratios simultaneously.

It is further preferred for the gear mechanism to have at least a first output and a second output, which outputs can be coupled selectively to the tool spindle for in order to be driven in rotation, wherein the first output is assigned to the first transmission stage and wherein the second output is assigned to the second transmission stage.

Thus, the gear mechanism can provide both the first transmission stage for the pilot drill and the second transmission stage for the drill bit. This can also take place simultaneously in principle.

Similarly, for instance the first output or the second output can suitably be switched on or off, or for instance be blocked, in order to drive the drill bit or the pilot drill selectively in the first rotational speed range or in the second rotational speed range, respectively.

In particular when the first output is blocked by the second output, the gear mechanism or the drive can be blocked in a simple manner. Such a "gear mechanism stop" can be used for instance to disengage a jammed drilling tool.

According to a development of this refinement, the tool spindle has a first spindle section and a second spindle section which can be rotated with respect to one another, wherein the first spindle section can be coupled to the first output and the pilot drill and wherein the second spindle section can be coupled to the second output and the drill bit.

In this way, the center drilling configuration and the core drilling configuration can in principle be provided at the same time. Thus, the gear mechanism can act for instance as a transfer gear mechanism which permanently provides two rotational speeds at the drive output. The pilot drill can penetrate into the workpiece at high rotational speed. The drill bit can be driven at a suitable, low rotational speed.

In such a configuration, there is in principle no need for the gear mechanism to switch between the center drilling configuration and the core drilling configuration. The operability of the drilling machine can be simplified considerably.

However, it is also conceivable in principle to connect the first spindle section or the second spindle section selectively to the first output or the second output, respectively, of the gear mechanism, or else to disconnect them therefrom. Thus, further application possibilities and operating modes can be achieved for the drilling machine.

According to a further aspect of the invention, the switching device has at least one coupling, which is designed to couple at least the pilot drill or the drill bit to the tool spindle so that they are driven selectively in rotation, or to disengage them.

The switching device can be a structural component of the gear mechanism or at least be indirectly or directly coupled functionally thereto.

The coupling may have various configurations. It can be understood to be a brake, barrier, a freewheel or the like. The coupling can interact for instance by way of a force fit, a friction fit, a form fit or in a suitable combination with the elements to be coupled.

According to a further refinement of the invention, the drilling machine has a control device which is designed to convert the drive selectively into the center drilling configuration or into the core drilling configuration, depending on operating states of the drilling machine.

To this end, the control device can interact for instance in a suitable manner with the switching device.

According to a development of this refinement, the control device is coupled to at least one sensor, in particular a force sensor, travel sensor or impact detector.

Thus, the drilling machine can in principle be converted from the center drilling configuration into the core drilling configuration in an automated manner for instance depending on the drilling progress.

A force sensor can be designed for instance to sense a feed force introduced by the operator. The fact that the force has exceeded or dropped below particular threshold values can be used as a trigger for the switching operation.

A travel sensor can be designed to sense a drilling depth of the pilot drill in the workpiece. Thus, the drilling machine can be converted into the core drilling configuration for instance when the drilling depth of the pilot drill is sufficient for the drilling machine to be guided properly.

An impact detector can be designed for instance to sense when the drill bit makes contact with the workpiece. The contact can trigger a switching pulse for switching the drive.

Other sensors are readily conceivable. Thus, for instance various state variables of the drive can be used as an indicator for the loading thereof. Indirect or direct determination of a torque at the drilling tool, i.e. for instance at the pilot drill or the drill bit, is conceivable in order to sense that the drill bit or pilot drill has made contact or been brought into engagement. On this basis, a switching operation can subsequently be triggered.

It is also preferred for it to be possible, for instance after a drilling operation has been carried out, to convert the drilling machine from the core drilling configuration into the center drilling configuration. In this way, the drilling machine can be available for a new drilling operation without any further preparation.

It goes without saying that, in addition or as an alternative to switching by means of the control device, manual actuation of the switching device may also be possible. Furthermore, the switching device can be designed to be operated selectively in an automatic mode or in a manual mode.

The flexibility of the drilling machine can be increased further. In particular, an experienced operator can operate the switching device manually. An inexperienced operator can leave the triggering of the switching operation to the control device.

According to a further aspect of the invention, at least the pilot drill or the drill bit is mounted in a longitudinally movable manner in relation to the tool spindle.

Nevertheless, the tool spindle can be configured as it were to selectively drive the pilot drill or the drill bit in rotation.

Mounting the drill bit or the pilot drill in a longitudinally movable manner can make it possible to use these as a "sensor" and, for instance depending on the axial position thereof, to trigger the switching device.

Furthermore, the driving in rotation of the pilot drill or of the drill bit by the tool spindle can be activated or deactivated depending on their axial position. It is also conceivable to use for instance an axial movement of the drill bit in order to selectively switch on or switch off the pilot drill. Alternatively or in addition, the drill bit can be switched on or off for instance depending on the axial position of the pilot drill.

According to a development of this refinement, a relative movement of the drill bit with respect to the tool spindle switches at least one coupling of the pilot drill.

Thus, in particular an engagement of the drill bit can allow the pilot drill to be deactivated. In this way, the drilling machine can be converted from the center drilling configuration into the core drilling configuration.

It should be noted that, in particular in the case of particularly deep core holes, the pilot hole does not have to be as deep as the core hole. A much shallower pilot drilling depth can nevertheless ensure good guidance of the drilling machine. If the pilot drill is deactivated after reaching a sufficient guidance depth, the drilling operation can be accelerated, since substantially the entire drive power can then be made available to the drill bit. Likewise, the service life in particular of the pilot drill can be increased, since the latter is now much more rarely in engagement.

Deactivation can be understood to mean that the pilot drill is disengaged from being driven in rotation by the tool spindle. However, axial movement of the pilot drill in relation to the drill bit can also prevent further penetration of the pilot drill into a workpiece to be drilled. In this case, the pilot drill can nevertheless still be driven in rotation by the tool spindle.

According to a further aspect of the invention, at least one stop element for the pilot drill is provided in the center drilling configuration, said stop element limiting a longitudinal movement of the pilot drill with respect to the tool spindle.

Thus, when the pilot hole is being drilled, substantially the entire feed force can act on the pilot drill. Axial displacement of the pilot drill can be avoided.

According to a development of this refinement, a longitudinal movement of the drill bit with respect to the tool spindle selectively disengages or engages the at least one stop element of the pilot drill.

Thus, the drill bit can easily deactivate the pilot drill. The deactivation can allow for instance the pilot drill to retract into the tool spindle or can disengage the pilot drill from being driven in rotation by the tool spindle.

Stop elements can be in the form for instance of balls, rollers, detents or the like. The at least one stop element can interact with the pilot drill at least in a force-fitting or form-fitting manner.

According to a further aspect of the invention, there is provided at least one spring element which produces a restoring force that acts at least on the pilot drill or the drill bit in the direction of the center drilling configuration.

The spring element can be understood generally to be a preloading element. The spring element can make it possible for instance for the drilling machine to be converted automatically from the core drilling configuration into center drilling configuration after a drilling operation has been carried out.

In addition, the spring element can in principle also help to eject a drilling core from the drill bit by moving the pilot drill.

A drilling machine-tool combination having a drilling machine according to one of the above mentioned aspects is particularly preferred, said drilling machine-tool combination having a tool which has a pilot drill and a drill bit, wherein the pilot drill and the drill bit can be mounted concentrically with one another, and wherein in particular the pilot drill is mounted on the drill bit, wherein the pilot drill and the drill bit can be driven selectively in rotation, wherein the pilot drill can be driven in a first rotational speed range, in particular in order to drill a pilot hole, wherein the drill bit can be driven in a second rotational speed range, in particular in order to drill a core hole, and wherein in particular at least the pilot drill or the drill bit are mounted in a longitudinally movable manner on the tool spindle.

According to a further embodiment of the invention, there is provided an adapter which is designed to be mounted on the tool spindle and which has a first drill mount for chucking the pilot drill and has a second drill mount for chucking the drill bit, and which activates the first transmission stage depending on the activation of the first drill mount when the pilot drill is chucked, and activates the second transmission stage when the second drill mount is activated when the drill bit is chucked.

In this case, the adapter can advantageously have a first adapter piece having the first drill mount for chucking the pilot drill and a second adapter piece having the second drill mount for chucking the drill bit, wherein the first or second transmission stage is activated depending on which adapter piece is fastened to the tool spindle.

The object of the invention is also achieved by a drilling machine-tool combination for drilling a core hole, in particular in a metal workpiece, wherein a pilot hole is drilled substantially in a first rotational speed range and a core hole is drilled substantially in a second rotational speed range, and wherein the pilot drill remains in the pilot hole while the core hole is drilled.

The object of the invention is finally achieved by the use of a tool combination comprising a pilot drill and a drill bit with a drilling machine of the above-described type.

With such a use, good guidance of the tool can be achieved in particular in the case of a hand-held core drilling machine. The drilling operation can be carried out substantially continuously, in particular without the drilling machine having to be put down in the meantime.

It goes without saying that the above mentioned features of the invention and those yet to be explained below can be used not only in the combination given in each case but also in other combinations or on their own, without departing from the scope of the present invention.

BRIEF DESCRIPTION OF THE DRAWINGS

Further features and advantages of the invention can be gathered from the following description of a number of preferred exemplary embodiments with reference to the drawings, in which.

DETAILED DESCRIPTION OF PREFERRED EMBODIMENTS

Figure 1:
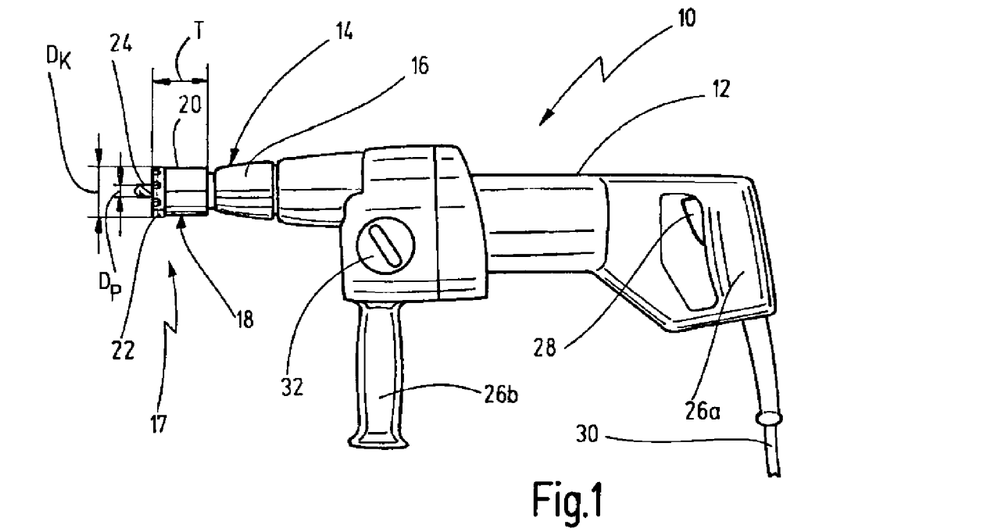
FIG. 1 shows a side view of a drilling machine according to the invention having a tool for core drilling.

A drilling machine is illustrated in FIG. 1 and denoted 10 as a whole. The drilling machine 10 is in the form of a hand-held core drilling machine. Hand-held core drilling machines can be used by an operator to drill core holes or the like, without a separate guide means, for instance a framework, stand or drilling stand, being required. Thus, core holes can be produced with high productivity over a short period of time.

The drilling machine 10 has a housing 12, which houses for instance a motor and a gear mechanism (not illustrated in FIG. 1). Provided at the tool end of the housing 12 is a tool mount 14, which in the present case has a sleeve 16. The sleeve 16 can be moved between a disengaged position and a chucking position for instance by displacement, rotation or a combined movement. In the chucking position, the tool mount 14 is designed to mount a tool 17 and secure it to the drilling machine 10. In the disengaged position, the tool 17 can be removed from the tool mount 14. Furthermore, for instance a further tool 17 can be supplied to the tool mount 14.

The tool 17 is formed in the present case as a core drilling tool. The tool 17 has a drill bit 18, which is provided with a substantially rotationally symmetrical support 20 and a cutting region 22. The support 20 is configured for instance in a cup-shaped manner and has the cutting region 22 at its workpiece-side circumferential edge. The cutting region 22 can have for instance a toothing. The cutting region 22 can be provided with cutting means, in particular abrasive cutting means. Alternatively or in addition, a segment-like tipping of the cutting region 22 is conceivable. The toothing, tipping or the cutting means can be designed in particular for machining or separating metal.

Concentrically with the drill bit 18, the tool 17 has a pilot drill 24. The pilot drill 24 is designed to drill a center hole or pilot hole, in order to guide the drilling machine 10 during the drilling of a core hole. The dimensions of the core hole can be achieved substantially from a diameter $D_K$ of the cutting region 22 of the drill bit 18 and a free depth T of the support 20 of the drill bit 18, minus the wall thickness of the end face. The pilot drill 24 has a diameter $D_P$. The pilot drill 24 can be in the form for instance of a twist drill. The pilot drill 24 can be in the form of a metal drill, in particular when core holes are drilled in metal workpieces.

During drilling, in particular during drilling in metal, what is known as a cutting speed, that is to say a relative speed between the tool and the workpiece, is of great importance for the cutting capacity, tool service life, production of heat and the like. The cutting speed has considerable effects on the formation of chips in particular in cutting drilling. Criteria for selecting a suitable cutting speed can be in particular a material of the tool or a material of the workpiece to be drilled. At a given cutting speed, a suitable tool rotational speed can be determined on the basis of the tool diameter. However, during core drilling with the drill bit 18 and the pilot drill 24, there are two diameters $D_K$, $D_P$, which usually differ considerably from one another. The diameter $D_K$ of the drill bit 18 can be at a ratio of 2:1, 3:1, 5:1 or even 10:1 for instance with respect to the diameter $D_P$ of the pilot drill 24. Consequently, it can be advantageous to make the ratio between a rotational speed of the drill bit 18 and a rotational speed of the pilot drill 24 inversely proportional to one another in the same way. In this way, the pilot drill 24 and the drill bit 18 can be operated at at least similar cutting speeds.

It is possible to deviate from a "rigid" inverse proportionality between the ratios of the diameters and the rotational speeds or cutting speeds of the drill bit 18 and the pilot drill 24 for instance when the materials, in particular the cutting materials, of the cutting region 22 of the drill bit 18 and the pilot drill 24 differ from one another. Nevertheless, it can regularly be preferred regularly to drive the pilot drill 24 at a higher rotational speed than the drill bit 18 during drilling. For this purpose, in principle different configurations, which will be discussed in more detail below, are suitable.

The drilling machine 10 in FIG. 1 also has handle regions 26a, 26b, by means of which an operator can securely hold the drilling machine 10 and can guide it during drilling, for instance during core drilling. Two-handed holding and guiding can be advantageous in particular in the case of hand-held core drilling machines, for instance in order to absorb any counter-torque produced during drilling.

Mounted on the rear handle region 26a is a switch 28, by way of which the drilling machine 10 can be activated or deactivated selectively. Also indicated in FIG. 1 is a line 30 which can be connected for instance to a mains connection in order to supply energy. The drilling machine 10 can in principle have an electric drive. Also conceivable are pneumatic or hydraulic drives.

Also provided on the housing 12 is a switch 32, which can be coupled for instance to a gear mechanism. By actuating the switch 32, the operator can preselect different transmission ratios for the tool 17 and in particular operate the pilot drill 24 in a first transmission stage and the drill bit 18 in a second transmission stage.

Figure 2:
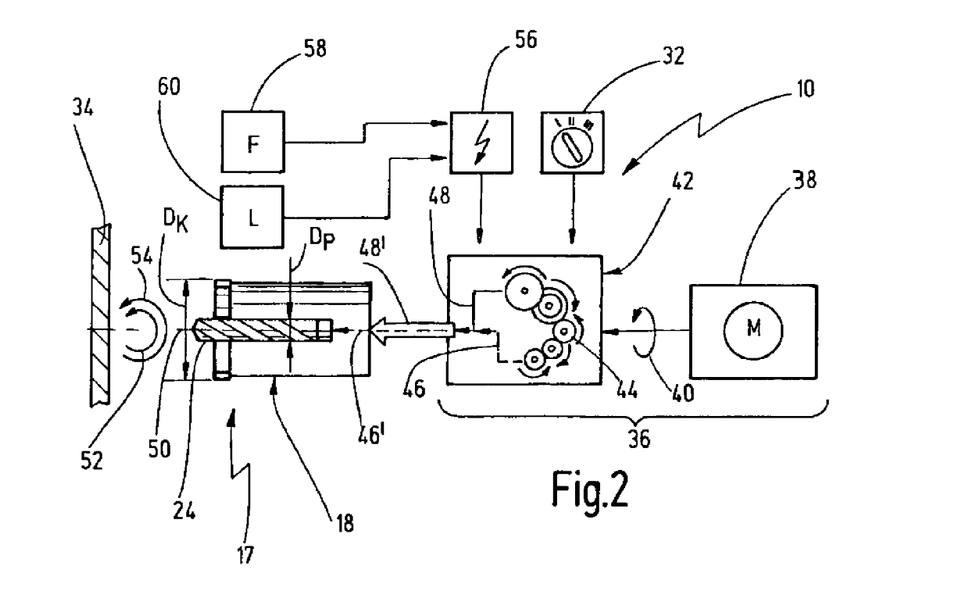
FIG. 2 shows a simplified schematic view of a first configuration of the drilling machine according to FIG. 1.

In FIG. 2, the drilling machine 10 is illustrated in a highly simplified schematic and symbolic manner. The outer structure of the drilling machine 10 can correspond for instance to the configuration in FIG. 1.

The drilling machine 10 is designed to drill a core hole in a workpiece 34. In this case, it may in particular be a metal workpiece. The drilling machine 10 has a drive 36, which can be accommodated for instance in the housing 12, cf. FIG. 1.

The drive 36 can comprise a motor 38, which can provide a rotational drive movement, cf. an arrow denoted 40. The drive 36 also has a gear mechanism 42, which can be driven via the motor 38. The gear mechanism 42 has a drive pinion 44, to which the motor 38 can be coupled.

The drive pinion 44 can be coupled to a first transmission stage 46 and a second transmission stage 48. The first transmission stage 46 serves in this case to drive the pilot drill 24, cf. a dashed arrow 46, 46'. The second transmission stage 48 is coupled to the drill bit 18 in order to drive the latter, cf. an arrow 48 and a block arrow 48'. FIG. 2 also schematically indicates that the second transmission stage 48 can bring about a greater reduction in the drive movement 40 of the motor 38 than the first transmission stage 46.

In other words, the gear mechanism 42 is designed to convert the drive movement 40 of the motor 38 selectively into a rotation of the pilot drill 24 about a longitudinal axis 50 at a first rotational speed, cf. an arrow denoted 52. In addition, the gear mechanism 42 is designed to convert the drive movement 40 of the motor 38 selectively into a rotation of the drill bit 18 about the longitudinal axis 50 at a second rotational speed, cf. an arrow denoted 54. In this case, the first rotational speed 52 can in principle be higher than the second rotational speed 54. The pilot drill 24 can rotate "more quickly" and thus be operated at a favourable cutting speed in spite of its smaller diameter D. The drill bit 18 can rotate "more slowly" at in principle the same rotational speed of the motor 38.

Different devices can be coupled to the drive 36 or the gear mechanism 42 in order, for instance during different portions of a drilling operation, to cause the drive 36 to selectively activate or deactivate for example the first transmission stage 46 or the second transmission stage 48. For instance the switch 32 can be used for this purpose, cf. also FIG. 1. The switch 32 in FIG. 2 has for instance three switching positions. For example, in a first switching position I, driving of the pilot drill 24 can be ensured by means of the first transmission stage 46. In this switching stage I, in particular a pilot hole can be set, with the drill bit 18 preferably not yet engaging in the workpiece 34. By contrast, in a second switching stage II, the drill bit 18 can be activated or be driven by means of the second transmission stage 48. This can take place at a fundamentally lower rotational speed and greater torque than the driving of the pilot drill 24 in the switching stage I.

In addition, the switch 32 has a third switching stage III. The switching stage III can be configured to allow automatic control of the gear mechanism 42. To this end, there can be provided a control device 56, which can be coupled to sensors, for instance a force sensor 58 or a travel sensor 60. The sensors 58, 60 can be designed to sense state variables of the drilling machine 10 and to communicate them to the control device 56. The travel sensor 60 can be designed for instance to sense a penetration depth of the pilot drill 24. The force sensor 58 can be designed for instance to sense a feed force applied by the operator and communicate this to the control device 56. Other sensors, which sense for instance the rotational speed of the motor 38, of the pilot drill 24 or of the drill bit 18, are conceivable. Rotational speeds of the gear mechanism 42 can also be monitored. In addition, sensing of a torque at the motor 38, at the pilot drill 24 or at the drill bit 18 is conceivable. Furthermore, for instance a relative position of the pilot drill 24 with respect to the drill bit 18 can be monitored.

Depending on the sensed state variables of the drilling machine 10, the control device 56 can bring about automatic switching of the gear mechanism 42. In this case, in particular the first transmission stage 46 or the second transmission stage 48 can be selectively switched on, switched off or blocked.

Figures 3, 4:
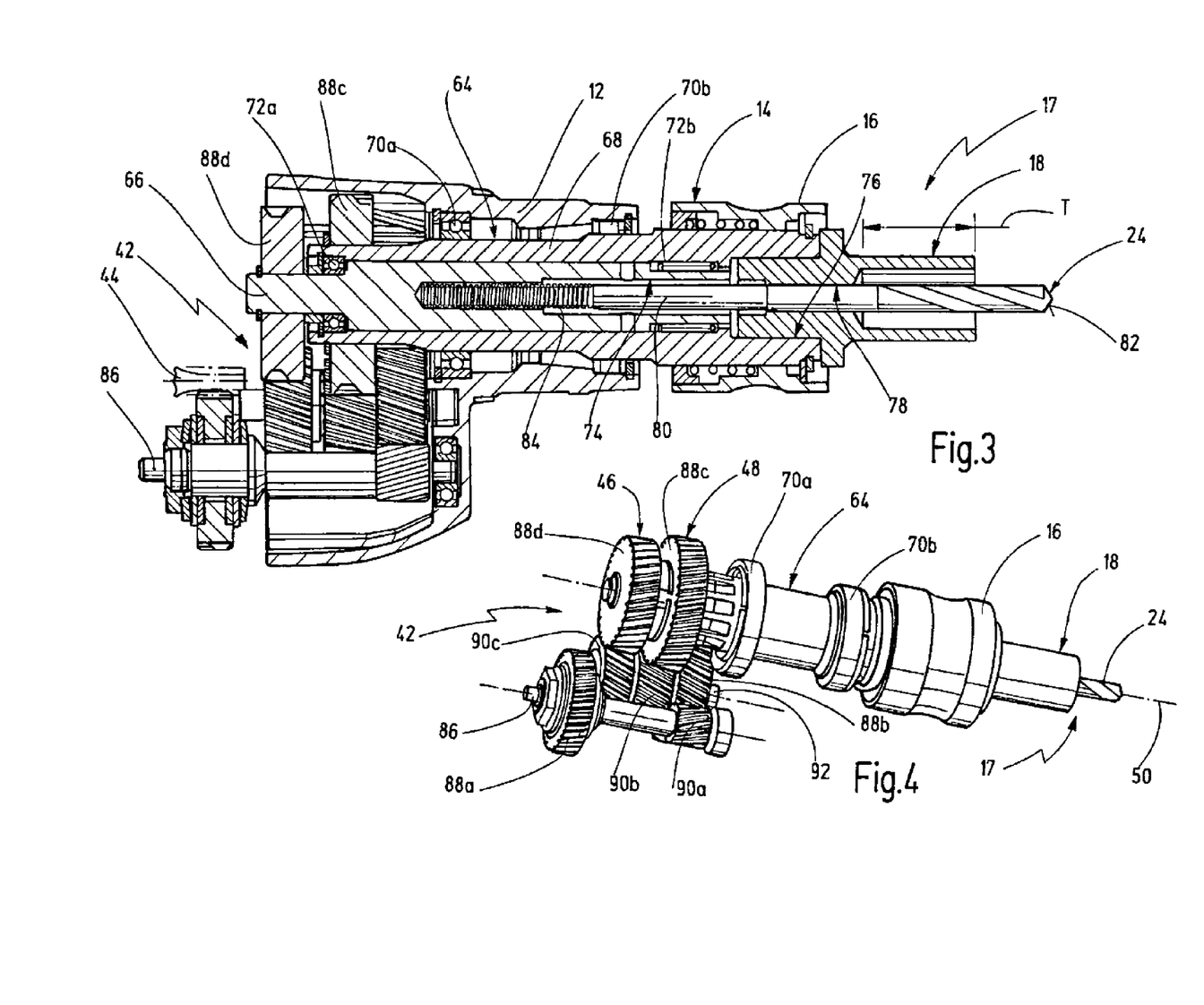
FIG. 3 shows a section through a gear mechanism of a drilling machine according to the invention.
FIG. 4 shows a perspective view of the gear mechanism according to FIG. 3 with the housing omitted.

FIG. 3 illustrates the gear mechanism 42, for instance of the drilling machine 10 according to FIG. 2, in section. FIG. 4 shows an associated perspective view with the housing 12 omitted.

The gear mechanism 42 is coupled to a tool spindle 64, on which the tool 17 is mounted. The tool spindle 64 has a first spindle section 66 and a second spindle section 68. The tool spindle 64 is mounted by way of spindle bearings 70a, 70b in the housing 12 of the drilling machine 10. In addition, the second spindle section 68 is mounted in a rotatable manner by way of spindle bearings 72a, 72b in the first spindle section 66.

A shank 80 of the pilot drill 24 is arranged in a recess 74 inside the tool spindle 64. The pilot drill 24 is also mounted on a center mount 78, which is assigned to the drill bit 18. The drill bit 18 is mounted on a tool mount 76 of the second spindle section 68 of the tool spindle 64. The first spindle section 66 is designed to drive the pilot drill 24 in rotation. The second spindle section 68 is designed to drive the drill bit 18 in rotation. The spindle sections 66, 68 are rotatable with respect to one another and can be operated simultaneously at different rotational speeds. Thus, the pilot drill 24 can also be rotated in relation to the drill bit 18.

The pilot drill 24 is in the form of a twist drill and has a cutting edge 82, which can have a center point. The pilot drill 24 is arranged by way of its shank 80 in a longitudinally movable manner counter to the force of a spring element 84 in the recess 74 in the second spindle section 68. A force on the pilot drill 24, said force being applied by the spring element 84 in the direction of the workpiece 34, can be used for instance to displace said pilot drill 24 in order to eject a drilling core out of the tool 17 after drilling has been carried out, cf. to this end for instance FIG. 12.

The gear mechanism 42 has an input shaft 86, which can be driven via the drive pinion 44, which is coupled to a wheel 88a. The drive pinion 44 can also be coupled to the motor 38, cf. FIG. 2. The input shaft 86 has a pinion 90a, cf. FIG. 4. The pinion 90a is coupled to a wheel 88b of an intermediate shaft 92. The intermediate shaft 92 also has a pinion 90b and a further pinion 90c. The pinion 90b is coupled to a wheel 88c which is arranged on the second spindle section 68. The pinion 90c is coupled to a wheel 88d which is arranged on the first spindle section 66. The pinion 90c and the wheel 88d are assigned to the first transmission stage 46, which serves primarily to drive the pilot drill 24. The pinion 90b and the wheel 88c are assigned to the second transmission stage 48, which serves primarily to drive the drill bit 18. The drill bit 18 can in principle be driven at a lower rotational speed than the pilot drill 24.

The gear mechanism 42 shown in FIGS. 3 and 4 can be understood to be a transfer gear mechanism. The gear mechanism 42 is designed to provide a first rotational speed at the first spindle section 66 by means of the first transmission stage 46 and simultaneously to provide a second rotational speed at the second spindle section 68 by means of the second transmission stage 48. Thus, the pilot drill 24 and the drill bit 18 can be driven in principle simultaneously in respectively suitable rotational speed ranges.

Furthermore, it is also possible in principle for there also to be elements which are designed to selectively suppress at least the drive or a feed of the pilot drill 24 or of the drill bit 18.

Viewed together, FIGS. 5 to 8 show a further configuration of a gear mechanism 42a, which can in principle likewise be installed in the core drilling machine 10 according to FIG. 1.

The gear mechanism 42a has a basic structure similar to the configuration of the gear mechanism 42 according to FIG. 3. However, a modified functionality is provided in the case of the gear mechanism 42a.

The gear mechanism 42a is switchable. The gear mechanism 42a can in principle be switched manually via the switch 32, cf. FIGS. 1 and 2. In addition, automated switching by the control device 56 is possible depending on operating states of the drilling machine 10, cf. for instance FIG. 2.

In order to allow a switching functionality, the drill bit 18 is designed to be longitudinally movable with respect to the tool spindle 64, cf. an arrow denoted 94. In FIGS. 5 to 8, the tool spindle 64 is designed substantially in one piece, in contrast to the design shown in FIG. 3. Thus, the tool spindle 64 is designed in principle to drive the drill bit 18 and the pilot drill 24 jointly at the same rotational speed.

However, the gear mechanism 42a is switchable, and so a first rotational speed range, in which the pilot drill 24 penetrates into the workpiece 34, can be provided, for instance during a core drilling operation. After this, a switching operation can take place and then the drill bit 18 can in principle be driven in a second rotational speed range and penetrate into the workpiece 34. The pilot drill 24 can in principle corotate in parallel in the same rotational speed range. However, it is also conceivable to suppress the driving in rotation of the pilot drill 24 by the spindle 64, or else to prevent the pilot drill 24 from penetrating further into the workpiece 34. To this end, it can be provided for the pilot drill 24 to be able to retract into the recess 74 in the tool spindle 64 when the drill bit 18 engages with the workpiece 34. Such a configuration is explained in more detail by way of example below on the basis of FIGS. 11a-11d.

Figure 5:
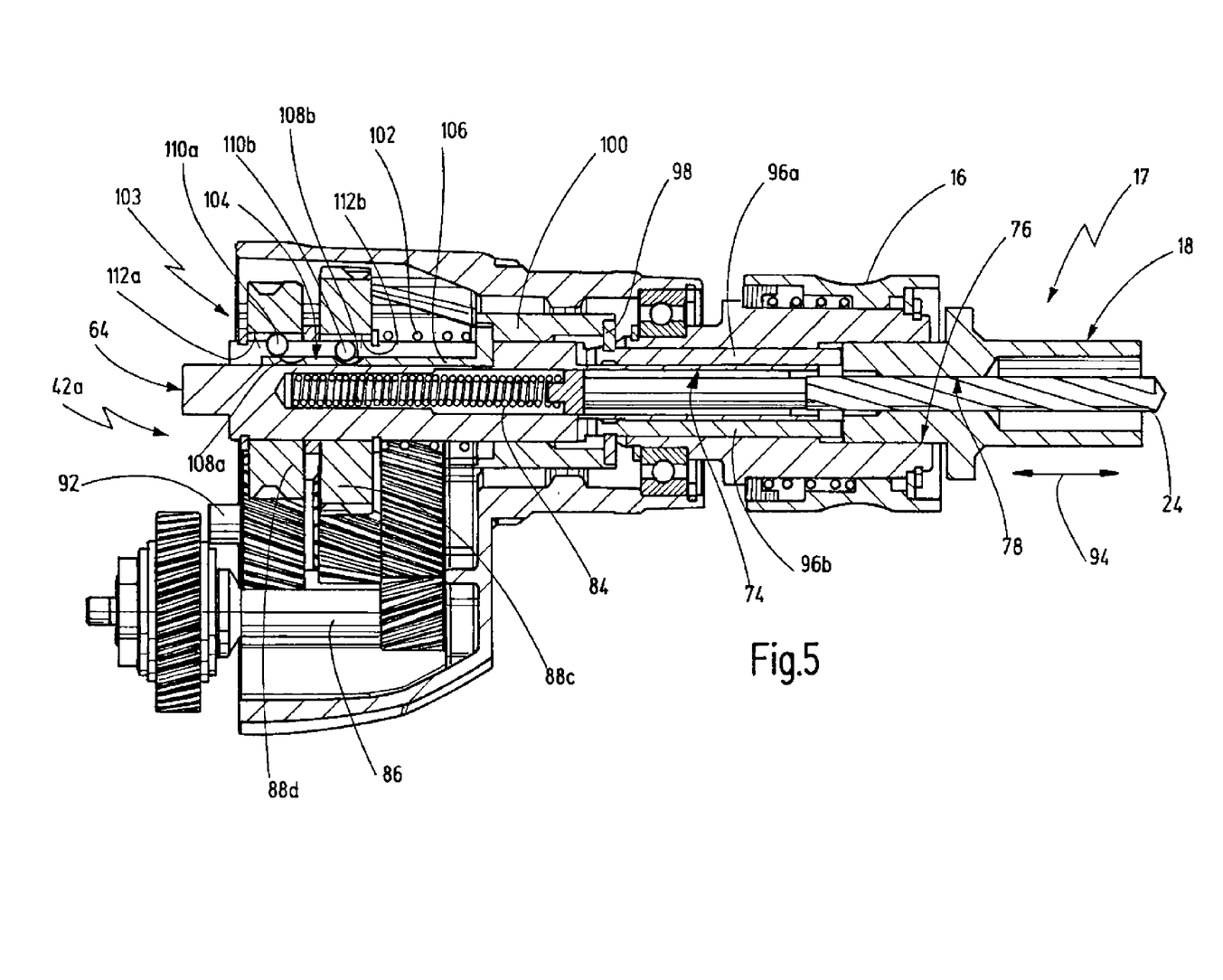
FIG. 5 shows a section through a modified gear mechanism with respect to FIG. 3 in a center drilling configuration.

In FIG. 5, the drill bit 18 is coupled at its machine-side end to plungers 96a, 96b and, in the event of a longitudinal movement in the direction of the gear mechanism 42a, can move said plungers 96a, 96b in relation to the spindle 64. The plungers 96a, 96b are coupled to a washer 98 and can act on a pressure piece 100 by way of said washer 98. The pressure piece 100 is preloaded by a spring element 102 in the direction of the tool 17.

The pressure piece 100 is designed to actuate a switching device 103 which has a coupling 104. To this end, the pressure piece 100 is coupled to a switching element 106 which can be in the form of a sliding switch, for instance. The coupling 104 has driver elements 110a, 110b, which can be in the form of balls, for instance. The driver elements 110a, 110b can be engaged selectively into recesses 112a, 112b in the wheels 88d, 88c by the switching element 106. Thus, the switching device 103 can selectively bring about at least one drive of the tool spindle 64 by means of the first transmission stage 46 or of the second transmission stage 48, cf. also FIG. 6.

For this purpose, the switching element 106 has latching points 108a, 108b, which can selectively receive the driver elements 110a, 110b depending on the position of the switching element 106, so that said driver elements 110a, 110b can disengage from the recesses 112a, 112b.

In FIG. 5, the gear mechanism 42a is illustrated for instance in a center drilling configuration. The drill bit 18 has not been moved along the tool spindle 64 in the direction of the gear mechanism 42a. In particular the spring element 102 can in this case act on the drill bit 18 by way of the switching element 106, the pressure piece 100, the washer 98 and the plungers 96a, 96b. In other words, the spring element 102 can help to displace the drill bit 18 in the direction of the center drilling configuration. In this configuration, the switching element 106 is arranged in such a way with respect to the tool spindle 64 that the driver element 110a can escape from the latching point 108a and engage in the recess 112a in the wheel 88d. The driver element 110b is disengaged from the recess 112b in the wheel 88c and received in the latching position 108b.

Thus, in the configuration shown in FIG. 5, a rotation transmitted from the input shaft 86 to the intermediate shaft 92 acts on the tool spindle 64 via the wheel 88d, which is associated with the first transmission stage 46. The wheel 88c, which is assigned to the second transmission stage 48, is uncoupled from the tool spindle 64. In the center drilling configuration, the pilot drill 24 can be driven in a high rotational speed range in order to drill a pilot hole.

Figures 6, 7, 8:
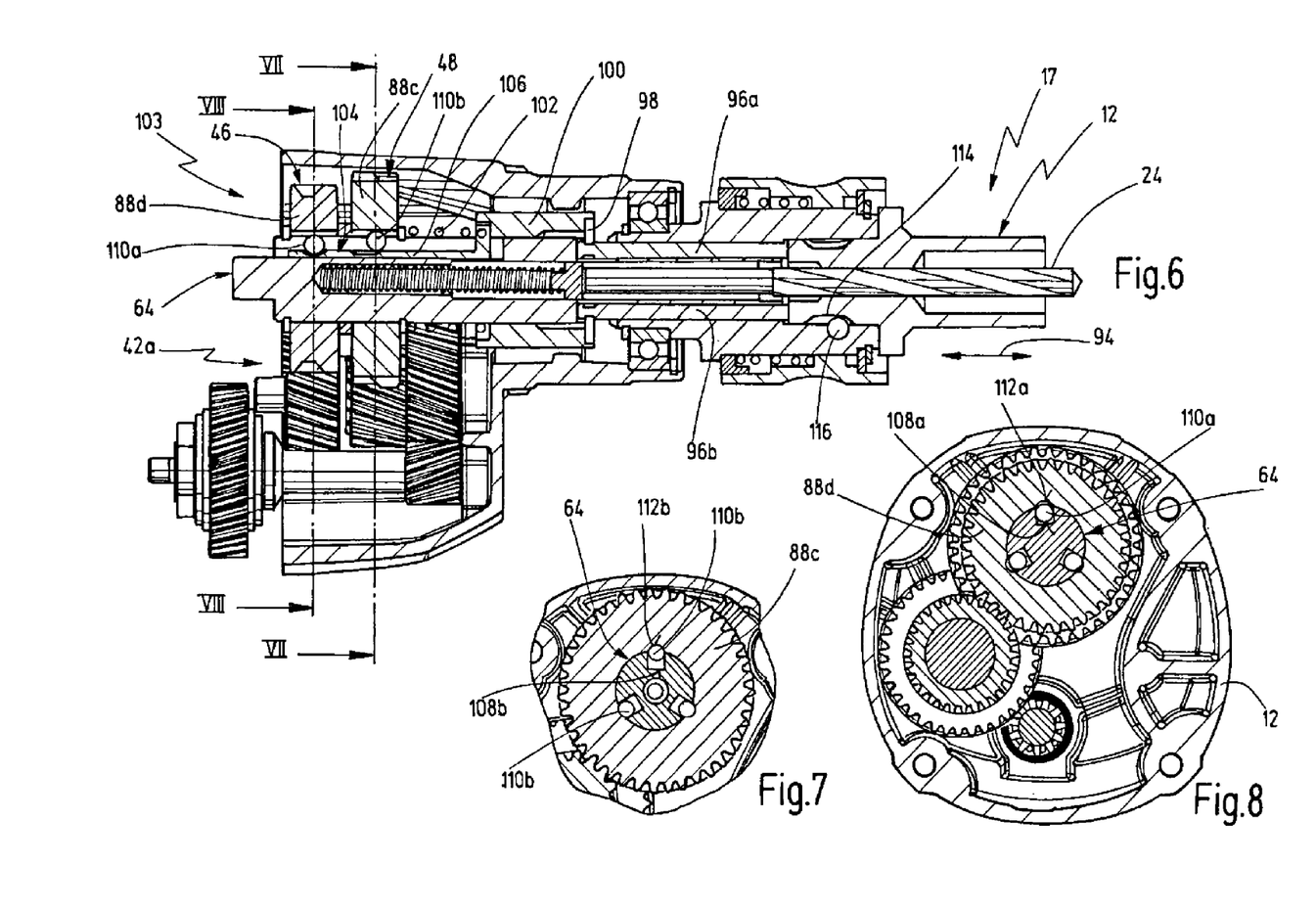
FIG. 6 shows the gear mechanism according to FIG. 5 in a core drilling configuration.
FIG. 7 shows a cutaway section through the gear mechanism according to FIG. 6 along the line VII-VII.
FIG. 8 shows a section through the gear mechanism according to FIG. 6 along the line VIII-VIII.

In FIGS. 6 to 8, the gear mechanism 42a is illustrated for instance in a core drilling configuration. The switching device 103 can be switched by the drill bit 18 being moved in relation to the tool spindle 64, cf. also the arrow 94. The movement can be brought about for instance by the drill bit 18 coming into abutment against the workpiece 34, cf. also FIGS. 9a and 9b.

A longitudinal guide 114 on the drill bit 18, which interacts with a driver element 116, allows a certain longitudinal movement of the drill bit 18 in relation to the tool spindle 64, although the drill bit 18 can still be driven in rotation. The driver element 116 is mounted on the tool spindle 64. In FIG. 6, the longitudinal movement of the drill bit 18 has likewise brought about a longitudinal movement of the plungers 96a, 96b, the washer 98, the pressure piece 100 and the switching element 106 in the direction of the gear mechanism 42a. In contrast to the center drilling configuration shown in FIG. 5, in the core drilling configuration, the driver element 110a is disengaged from the recess 112a and received by the latching point 108a, cf. also FIG. 8. The driver element 110b, on the other hand, is engaged in the recess 112b and has escaped from the latching point 108b, cf. also FIG. 7. Thus, the wheel 88c, which is assigned to the second transmission stage 48, is connected to the tool spindle 64 in order to be driven in rotation. The wheel 88d, which is assigned to the first transmission stage 46, is uncoupled from the tool spindle 64. In the core drilling configuration, the tool spindle 64 and the drill bit 18 are driven in a rotational speed range suitable for them, said rotational speed range allowing in principle lower rotational speeds than in the center drilling configuration.

It is in principle conceivable to couple the switching device 103 to a switch for manual actuation, for instance the switch 32. Thus, the operator can benefit from the automated switching operation (by the displacement of the drill bit 18), and can also transfer the gear mechanism 42a manually into a suitable setting.

Figure 9A:
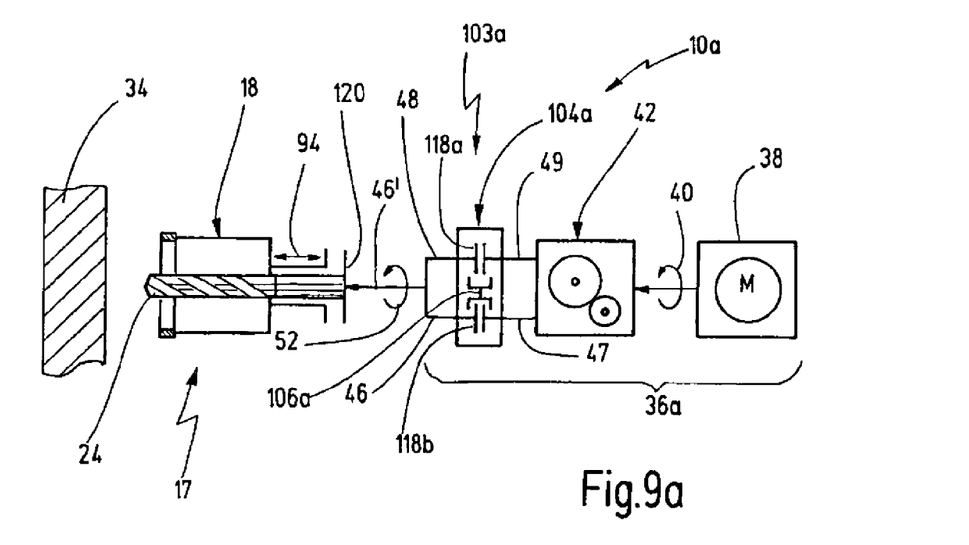
FIGS. 9a, 9b
show a highly simplified schematic illustration of another configuration of the drilling machine according to FIG. 1 during the drilling of a pilot hole.
Figure 9B:
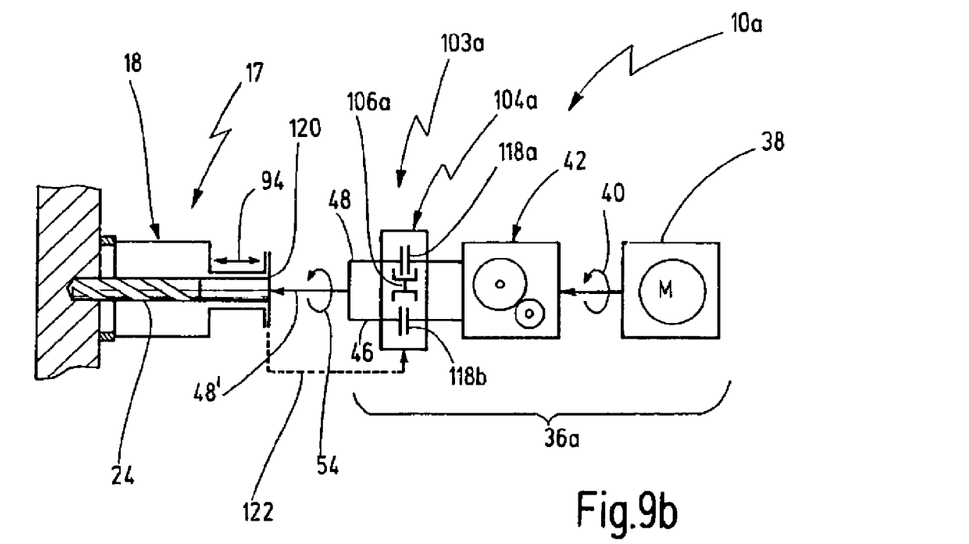

FIGS. 9a and 9b indicate the setting of a pilot hole in an example of a core drilling operation. A drilling machine 10a is in this case illustrated schematically in a highly simplified manner. A drive 36a has a motor 38 and a gear mechanism 42. The gear mechanism 42 has a first output 47 and a second output 49. The first output 47 is associated with the first transmission stage 46. The second output 49 is assigned to the second transmission stage 48. A switching device 103a is provided with a coupling 104a, which has part couplings 118a, 118b. The part coupling 118a is assigned to the second transmission stage 48. The part coupling 118b is assigned to the first transmission stage 46. A switching element 106a is designed to selectively open or close alternately the part coupling 118a or the part coupling 118b. Depending on the position of the switching element 106a, the tool 17 can be driven by means of the first transmission stage 46, 46' or by means of the second transmission stage 48, 48'.

In FIG. 9a, the drilling machine 10a is shown in the center drilling configuration. The coupling 118a is open, the coupling 118b closed. In this configuration, the pilot drill 24 can be driven in a high rotational speed range in order to set a pilot hole, cf. the arrow 52. The pilot drill can be driven in the first transmission stage 46, 46'. In this case, the drill bit 18 can in principle be uncoupled from being driven in rotation or else rotate together with the pilot drill 24.

In FIG. 9b, the pilot drill 24 has penetrated into the workpiece 34, and furthermore the drill bit 18 has come into abutment against the workpiece 34. In this case, the drill bit 18 has been moved in relation to the pilot drill 24, cf. an arrow denoted 94. This movement in the direction of a stop 120 can be detected and produce a switching pulse 122, which is evaluated for instance by a control device 56, cf. for instance FIG. 2, in order to activate the switching element 106a accordingly. In FIG. 9b, the switching element 106a has been displaced by the part coupling 118b in the direction of the part coupling 118a. The part coupling 118a is closed, the part coupling 118b open. The tool 17 can be driven in a low rotational speed range by means of the second transmission stage 48, 48', cf. for instance the arrow 54, this rotational speed range being particularly suitable for core drilling.

In the core drilling configuration, at least the drill bit 18 is operated in the second rotational speed range. The pilot drill 24 can, however, likewise be driven in the second rotational speed range, or else be disengaged selectively from being driven in rotation.

Figure 10A:
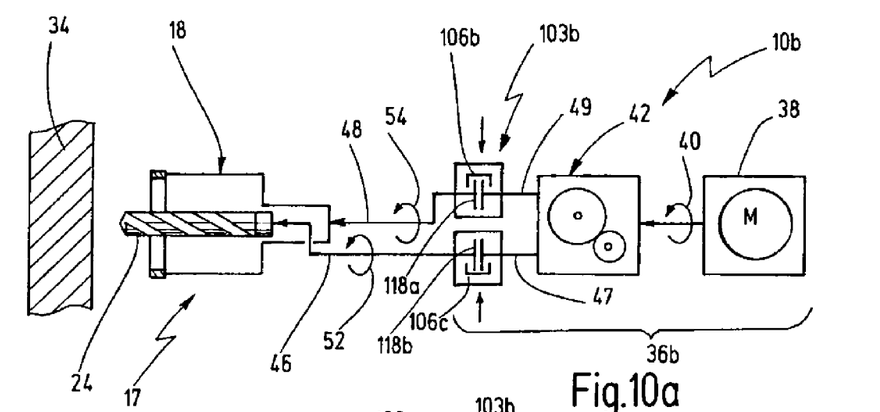
FIGS. 10a-10c
show another highly simplified schematic illustration of yet another configuration of the drilling machine according to FIG. 1 during the drilling of a pilot hole.
Figure 10B:
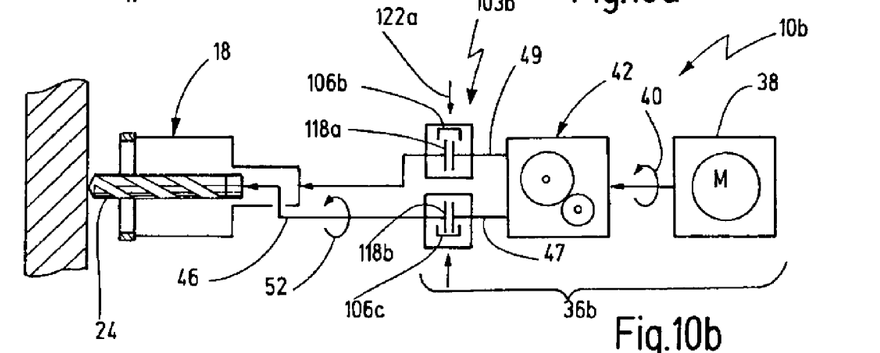
Figure 10C:
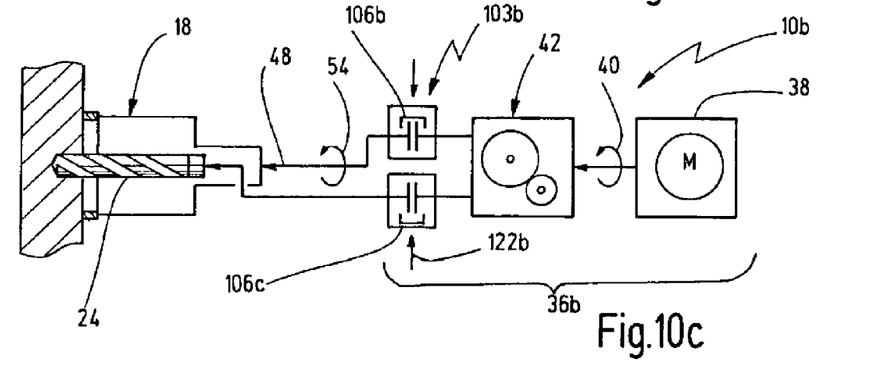

In FIGS. 10a to 10c, a further core drilling machine 10b is illustrated schematically in a highly simplified manner during a core drilling operation.

The core drilling machine 10b has a drive 36b which is modified with respect to FIGS. 9a, 9b. Both the first output 47 and the second output 49 of the gear mechanism 42 can be coupled, independently of one another, selectively to the tool 17 in order to drive it in rotation. The first output 47 is associated with the first transmission stage 46 and coupled via the part coupling 118b to the pilot drill 24 in order to drive it in rotation. The second output 49 is assigned to the second transmission stage 48 and coupled via the part coupling 118a to the drill bit 18 in order to drive it in rotation.

Switching elements 106b, 106c can open or close the part couplings 118a, 118b independently of one another. In FIG. 10a, the part couplings 118a, 118b are closed. The pilot drill 24 is driven in a first rotational speed range, cf. the arrow 52. The drill bit 18 is driven simultaneously in a second rotational speed range, cf. the arrow 54.

In FIG. 10b, the switching element 106b of the part coupling 118a is disengaged, the drill bit 18 is uncoupled from the second output 49 of the gear mechanism 42. The switching element 106c is engaged, so that the pilot drill 24 is driven in rotation in the first transmission stage 46. The drilling machine 10b is in the center drilling configuration. All of the drive power can be supplied substantially to the pilot drill 24.

In FIG. 10c, the pilot hole in the workpiece 34 has been produced. The drilling machine 10b has been transferred into the core drilling configuration. To this end, the switching element 106c is disengaged and the switching element 106b engaged. The pilot drill 24 is excluded from being driven in rotation. The drill bit 18 is driven by means of the second transmission stage 48 in a second, low rotational speed range, cf. the arrow 54. All of the drive power can be applied substantially for core drilling. When the drill bit 18 penetrates into the workpiece 34, the latter can be displaced in relation to the pilot drill 24, which no longer penetrates into the workpiece 34.

The design shown in FIGS. 10a to 10c can be understood for instance as a development of the gear mechanism 42 shown in FIGS. 3 and 4.

FIGS. 11a to 11d illustrate a further drive 36c in a drilling machine 10c. The basic structure of the drive 36c corresponds for instance to the drive 36a according to FIGS. 9a, 9b.

However, in addition there is provided a tool spindle 64a, which is designed to allow the pilot drill 24 to selectively retract, in order to prevent the latter from penetrating further into the workpiece 34. The tool spindle 64a has stop elements 124, for instance in the form of balls or rollers. The stop elements 124 are secured by a sleeve 126 in a position which allows the position of the pilot drill 24 with respect to the tool spindle 64a to be delimited axially. In the configuration shown in FIG. 11a, the pilot drill 24 cannot move beyond the stop elements 124 counter to the force of a spring element 84a in the direction of the gear mechanism 42, cf. an arrow denoted 94b.

In the center drilling configuration, the pilot drill 24 can penetrate with high feed forces into the workpiece 34 without being able to be displaced along the tool spindle 64a beyond the stop elements 124. In this case, the pilot drill 24 can be driven in the first rotational speed range, for instance analogously to the design shown in FIGS. 9a, 9b, cf. also the arrow 52.

Figures 11A, 11B, 11C, 12:
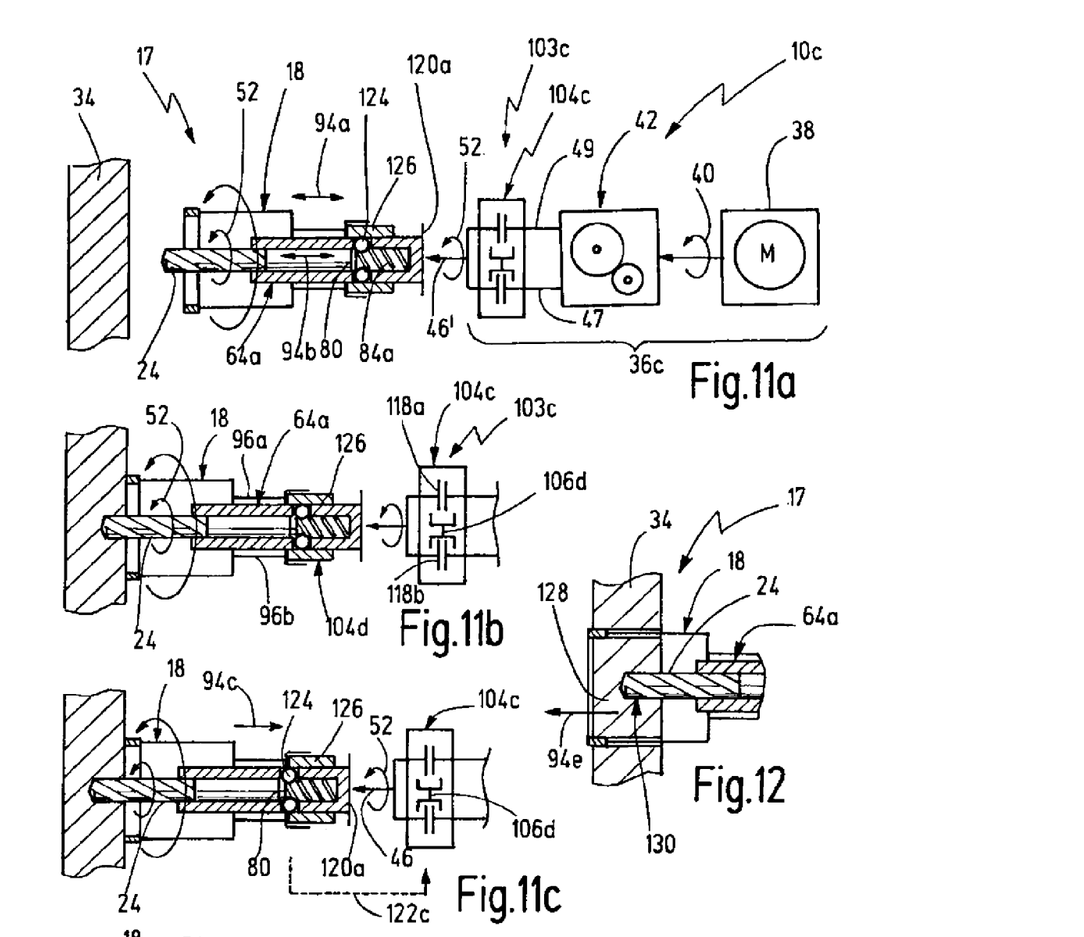
FIGS. 11a-11d
show yet another highly simplified schematic illustration of another configuration of the drilling machine according to FIG. 1 during the drilling of a pilot hole and of a core hole.
FIG. 12 shows a simplified, schematic cutaway view of the drilling machine according to FIGS. 11a-11d after the core drilling operation.

In FIG. 11b, the pilot drill 24 has penetrated into the workpiece 34 to a certain degree. The drill bit 18 comes into abutment against the workpiece 34. The drill bit 18 is mounted on the tool spindle 64a such that it can be moved longitudinally along the latter in principle independently of the pilot drill 24, cf. an arrow denoted 94a in FIG. 11a. The drill bit 18 can act on the sleeve 126 via plungers 96a, 96b or the like. A longitudinal movement of the drill bit 18 in the direction of the gear mechanism 42 causes likewise a longitudinal movement of the sleeve 126. Alternatively, the drill bit 18 can be configured for instance integrally with the sleeve 126.

In FIG. 11c, the pilot drill 24 has penetrated even further into the workpiece 34 compared with the position shown in FIG. 11b. The drill bit 18 has already moved a certain distance along the tool spindle 64a in the direction of a stop 120a. Likewise, the sleeve 126 has moved. However, the stop elements 124 continue to be secured by the sleeve 126 in FIG. 11c, and so the pilot drill 24 is still prevented from moving axially over the stop elements 124. The position shown in FIG. 11c can also bring about a switching pulse 122c, which brings about for instance a displacement of the switching element 106d in order to switch the switching device 103c or the gear mechanism 42.

Figure 11D:
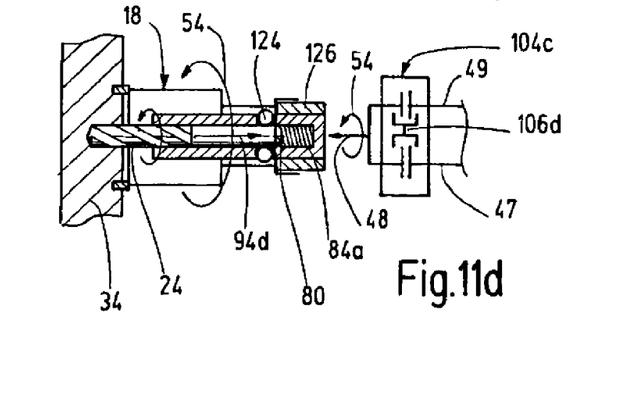

In FIG. 11d, the switching operation has been concluded. The drilling machine 10c is in the core drilling configuration. The gear mechanism 42 provides the second transmission stage 48, cf. the arrow 54.

The drill bit 18 has moved the sleeve 126 against the stop 120a. Thus, feed forces can be transmitted to the drill bit 18 and the drill bit 18 can penetrate into the workpiece 34. The movement of the sleeve 126 has released the stop elements 124. These have been disengaged and the pilot drill 24 can retract beyond the stop elements 124, counter to the force of the spring element 84a, into the tool spindle 64a in the direction of the gear mechanism 42, cf. an arrow denoted 94d. In this case, the pilot drill 24 is excluded substantially from penetrating further into the workpiece 34. Thus, all of the drive power can be transmitted substantially to the drill bit 18.

Illustrated by way of example in FIG. 12 is a state in which core drilling has been concluded. The drill bit 18 has passed all the way through the workpiece 34. The pilot drill 24 has set an initial pilot hole 130, but has not penetrated into the workpiece 34 any further beyond this pilot hole 130. The drilling has produced a drilling core 128. The drilling core 128 can be ejected from the drill bit 18 for instance by the pilot drill 24 being moved axially in relation to the tool spindle 64a and to the drill bit 18. The movement can be initiated by the spring element 84a, cf. also FIG. 11d. At the same time, the drilling machine 10c can in the process be transferred from the core drilling configuration into the center drilling configuration again.

Finally, FIG. 13 shows an adapter having two adapter pieces for chucking the pilot drill 24 and for chucking the drill bit 18, respectively.

Figure 13A:
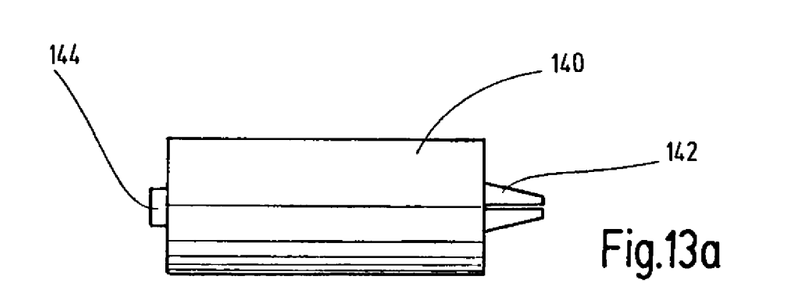
FIG. 13 shows an adapter for fastening on the tool spindle, having a first adapter piece for chucking the pilot drill (FIG. 13a) and a second adapter piece for chucking the drill bit (FIG. 13b) and for controlling the transmission ratio depending on the adapter piece used.
Figure 13B:
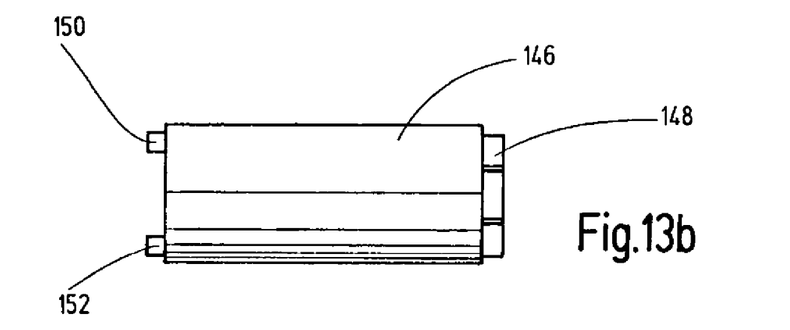

FIG. 13a shows a first adapter piece 140 having a first drill mount 142 for chucking the pilot drill 24, while FIG. 13b shows a second adapter piece 146 having a second drill mount 148 for chucking the drill bit 18. Either the first transmission stage 46 or the second transmission stage 48 is activated, depending on whether the first adapter piece 140 with the pilot drill or the second adapter piece 146 with the drill bit 18 is fastened to the tool spindle 64. To this end, a detector can be provided on the tool spindle 64, said detector being controlled via a form fit with a form-fitting element 144 on the first adapter piece 140 or with form-fitting elements 150, 152 on the second adapter piece 146.

What is claimed is:

1. A core drilling machine, comprising:
   a tool spindle for driving a tool;
   a drive including a motor for driving said tool spindle, said drive including at least a first transmission stage and a second transmission stage;
   a center mount provided on said tool spindle for mounting a pilot drill having a first outer diameter;
   a tool mount provided on said tool spindle for mounting a core drill bit being substantially cup shaped and having an second outer diameter, wherein said center mount and said tool mount are arranged substantially concentrically with one another; and
   a switching device interacting with said drive, said center mount and said tool mount;
   wherein said switching device is configured for operating said drive selectively at least in a center drilling configuration or in a core drilling configuration, wherein, when being in said center drilling configuration, at least said pilot drill can be driven in said first transmission stage, and wherein, when being in said core drilling configuration, at least said core drill bit can be driven in said second transmission stage;
   whereby said pilot drill can be driven at a first rotational speed range, and said core drill bit can be driven at a second rotational speed range different from said first rotational speed range; and
   wherein a ratio between said second outer diameter of said core drill bit and said first outer diameter of said pilot drill is at least 2:1.

2. The core drilling machine of claim 1, which is configured as a hand-held core drilling machine.

3. The core drilling machine of claim 1, wherein said drive further comprises a gear mechanism being connected between said motor and said tool spindle, and which provides a first transmission ratio in said first transmission stage, and a second transmission ratio in said second transmission stage.

4. The core drilling machine of claim 3, wherein said gear mechanism has at least a first output and a second output, which outputs can be coupled selectively to said tool spindle in order to be driven in rotation, wherein said first output is assigned to said first transmission stage and wherein said second output is assigned to said second transmission stage.

5. The core drilling machine of claim 4, wherein said tool spindle comprises a first spindle section and a second spindle section which can be rotated with respect to one another, wherein said first spindle section can be coupled to said first output and said pilot drill, and wherein said second spindle section can be coupled to said second output and said drill bit.

6. The core drilling machine of claim 1, wherein said switching device comprises at least one coupling, which is configured for coupling said tool spindle at least to said pilot drill or to said drill bit so that they are driven selectively in rotation, or for disengaging them.

7. The core drilling machine of claim 1, further comprising a control device which is configured for converting said drive selectively into said center drilling configuration or into said core drilling configuration, depending on particular operating states of said drilling machine.

8. The core drilling machine of claim 7, wherein said control device comprises at least one sensor.

9. The core drilling machine of claim 1, wherein at least one of said pilot drill and said drill bit is mounted longitudinally movably with respect to said tool spindle.

10. The core drilling machine of claim 9, wherein at least one coupling of said pilot drill is configured for switching between different states upon moving said drill bit with respect to said tool spindle.

11. The core drilling machine of claim 10, further comprising at least one stop element for said pilot drill in said center drilling configuration, said stop element being arranged for limiting a longitudinal movement of said pilot drill with respect to said tool spindle.

12. The core drilling machine of claim 10, wherein a longitudinal movement of said drill bit with respect to said tool spindle selectively disengages or engages said at least one stop element of said pilot drill.

13. The core drilling machine of claim 1, further comprising at least one spring element which generates a restoring force that acts at least on said pilot drill or said drill bit in the direction of said center drilling configuration.

14. The core drilling machine of claim 1, further comprising an adapter being configured for mounting on said tool spindle and comprising a first drill mount for chucking said pilot drill, and further comprising a second drill mount for chucking said drill bit, wherein said adapter, when said drill bit is chucked, activates said first transmission stage upon activation of said first drill mount, and activates said second transmission stage upon activation of said second drill mount.

15. The core drilling machine of claim 14, wherein said adapter comprises a first adapter piece having said first drill mount for chucking said pilot drill and further comprises a second adapter piece having said second drill mount for chucking said core drill bit, wherein said first or second transmission stage is activated depending on which adapter piece is fastened to said tool spindle.

16. A core drilling machine, comprising:
a tool spindle for driving a tool;
a drive including a motor for driving said tool spindle, said drive including at least a first transmission stage and a second transmission stage;
a center mount provided on said tool spindle for mounting a pilot drill having a first outer diameter;
a tool mount provided on said tool spindle for mounting a core drill bit being substantially cup shaped and having an second outer diameter;
wherein said center mount and said tool mount are arranged substantially concentrically with one another;
wherein said center mount is configured for coupling to said first transmission stage of said drive;
wherein said tool mount is configured for coupling to said second transmission stage of said drive;
whereby said pilot drill can be driven at a first rotational speed range, and said core drill bit can be driven at a second rotational speed range different from said first rotational speed range;
wherein a ratio between said second outer diameter of said core drill bit and said first outer diameter of said pilot drill is at least 2:1; and
a switching device interacting with said drive and being configured for operating said drive selectively at least in a center drilling configuration or in a core drilling configuration, wherein, when being in said center drilling configuration, at least said pilot drill can be driven in said first transmission stage, and wherein, when being in said core drilling configuration, at least said core drill bit can be driven in said second transmission stage.

17. A core drilling machine, comprising:
a tool spindle for driving a tool;
a drive including a motor for driving said tool spindle, said drive including at least a first transmission stage and a second transmission stage;
a center mount provided on said tool spindle for mounting a pilot drill having a first outer diameter;
a tool mount provided on said tool spindle for mounting a core drill bit being substantially cup shaped and having an second outer diameter;
wherein said center mount and said tool mount are arranged substantially concentrically with one another;
wherein said center mount is configured for coupling to said first transmission stage of said drive;
wherein said tool mount is configured for coupling to said second transmission stage of said drive;
whereby said pilot drill can be driven at a first rotational speed range, and said core drill bit can be driven at a second rotational speed range different from said first rotational speed range;
wherein a ratio between said second outer diameter of said core drill bit and said first outer diameter of said pilot drill is at least 2:1;
wherein said drive further comprises a gear mechanism being connected between said motor and said tool spindle, and which provides a first transmission ratio in said first transmission stage, and a second transmission ratio in said second transmission stage; and
wherein said gear mechanism has at least a first output and a second output, which outputs can be coupled selectively to said tool spindle in order to be driven in rotation, wherein said first output is assigned to said first transmission stage and wherein said second output is assigned to said second transmission stage.

* * * * *